United States Patent [19]

Patukonis et al.

[11] Patent Number: 4,495,556
[45] Date of Patent: Jan. 22, 1985

[54] VOLTAGE DOUBLER CIRCUIT

[75] Inventors: Robert J. Patukonis, Ijamsville; Harmon W. Banning, Derwood, both of Md.

[73] Assignee: Weinschel Engineering, Gaithersburg, Md.

[21] Appl. No.: 445,389

[22] Filed: Nov. 30, 1982

[51] Int. Cl.³ .............................................. H02M 7/00
[52] U.S. Cl. ........................................ 363/59; 323/354
[58] Field of Search .................. 363/59; 323/352, 353, 323/354, 367; 364/841; 324/130

[56] References Cited

U.S. PATENT DOCUMENTS

| | | | |
|---|---|---|---|
| 1,858,267 | 5/1932 | Eames | 323/353 X |
| 2,462,551 | 2/1949 | Renner | 323/353 |
| 2,875,400 | 2/1959 | Cabaniss | 323/353 |
| 2,986,708 | 5/1961 | Buckley | 323/353 X |
| 3,015,790 | 1/1962 | Eisaman et al. | 323/354 X |
| 3,898,593 | 8/1975 | Qureshi | 323/354 X |

*Primary Examiner*—Peter S. Wong

[57] ABSTRACT

A voltage ratio doubler circuit comprising an input node maintained at a constant input voltage $V_{IN}$; an output node at an output voltage $V_{OUT}$; and means, coupled between the input node and the output node, for selectively determining the ratio $V_{OUT}/V_{IN}$ to equal either (a) a value K' or (b) a value K'/2 determined by impedances in the doubler circuit. In a first embodiment of the invention, the impedance of the load placed at the output node is matched with the system impedance of the doubler circuit. In this first embodiment, the input impedance, and hence the level of $V_{IN}$ at the input node does not vary regardless of which voltage ratio is selected. In a second embodiment, the load impedance and doubler circuit system impedance do not match. In this second embodiment, a leveller means is included. The leveller means provides a reference voltage $V_{REF}$ which varies with changes in input impedance at the input node. The reference voltage $V_{REF}$ is used to maintain $V_{IN}$ at a constant level. In each embodiment, the input node represents a virtual ground (at constant voltage) to the load. In the second embodiment, selecting between $V_{OUT}$:$V_{IN}$ ratios of K' and K'/2 results in a corresponding change in the ratio $V_{OUT}$:$V_{REF}$ between two values K and K/2. The values of K and K/2 are constants determined by the impedances in the doubler circuit and the load.

23 Claims, 6 Drawing Figures

VOLTAGE DOUBLER CIRCUIT

VOLTAGE DOUBLER CIRCUIT

VOLTAGE DOUBLER CIRCUIT

BACKGROUND OF THE INVENTION

In the past, numerous circuits have been devised which selectively changed the output level of a circuit between various levels.

Bradley, in U.S. Pat. No. 3,783,380, teaches a switching circuit for connecting an input either (a) directly to an output by shortcircuiting the input to the output or (b) through a resistor to the output, both terminals, of the resistor being permanently coupled to ground through respective resistors. While the reference discloses the selective varying of impedance between input and output, it does not disclose the fixing of the input to a constant level of voltage regardless of selected impedance and does not disclose the switching of impedances to effect a selectable (approximate) 6dB variation in the ratio of (a) the output voltage and (b) a reference level defined by a leveller circuit at the input end. Bradley, it is also noted, does not suggest how a single arrangement of circuit elements can be switched to effect ratio doubling while, at the same time, maintaining a constant voltage across the input thereto.

In U.S. Pat. No. 3,015,790, Eisaman discloses a circuit wherein the movement of ganged switches between two positions results in a step change in voltage. Therein, three resistors are placed in series across a battery; the output of the circuit being selectively taken across the first two or the second input to (a) define an ideal source input and (b) define a reference voltage against which the circuit output is compared is not considered by Eisaman. Also, selectively connecting an impedance either (a) between the input and an output circuit or (b) between the output circuit and ground is not suggested.

Further, in *IEE Transactions on Instrumentation and Measurement,* Volume IM-27, No. 1, March 1978, pp. 76-69, Somlo discusses a voltage doubling circuit for absolute calibration of attenuation measurement systems. Specifically, Somlo uses 3-dB waveguide couplers for providing two signal paths having identical phase and amplitude. Each path is provided with switching means for selectively including resistors connected to ground and disposed along such path. According to this design, however, the two paths must be isolated and maintain phase and amplitude identity which, Somlo indicates, cannot be achieved completely with his design. In addition, providing a constant voltage across the input to the circuit in Somlo regardless of whether or not a "voltage doubling" is performed, is not considered.

Further, it is noted none of the above patents or articles provide two impedances wherein either of which or both of which in parallel can be connected either in a series circuit between the input and output of a doubler circuit—with the other impedance, if any, being included in a shunt circuit to ground. Accordingly, the patents and articles do not teach a circuit having at its input what appears to the load to be a virtual ground (at a maintained constant voltage).

SUMMARY OF THE INVENTION

In order to overcome known, as well as unrecognized problems unresolved by prior technology, the present invention provides a voltage ratio doubler circuit having two paths which, because the doubler circuit can be made of miniature size, need not be strictly isolated and which need not strike a compromise between phase and amplitude identity in the two paths.

This object and others are achieved by the present voltage ratio doubler circuit which includes a voltage leveller circuit and an output circuit with an impedance network interposed therebetween. The voltage leveller circuit determines a first voltage $V_{IN}$ and, in one embodiment, a second voltage $V_{REF}$ which is defined between the two impedances in series between voltage $V_{IN}$ and ground. The output circuit determines an output voltage $V_{OUT}$ across a load impedance and includes an impedance between the impedance network and $V_{OUT}$. Switching means included in the impedance network selectively connects either (a) two impedances of the network between the voltage $V_{IN}$ and the output circuit in parallel or (b) one of the two impedances between the voltage $V_{IN}$ and the output circuit and the other between the output circuit and ground.

In a unique embodiment, by proper selection of impedance values in (a) the voltage leveller circuit; (b) the impedance network; and (c) the output circuit, the equivalent impedance seen across the input node, which is at the voltage $V_{IN}$ relative to ground, remains constant regardless of whether one or both of the impedances in the network are connected between $V_{IN}$ and the output circuit. Also, by proper impedance value selection, the ratio between the output voltage $V_{OUT}$ and $V_{REF}$ can be switched between values of $V_{OUT}/V_{REF}=K/2$ and $V_{OUT}/V_{REF}=K$ where K is an impedance-related constant. Similarly, the ratio $V_{OUT}/V_{IN}$ can be switched between values of $K'/2$ and $K'$, where K and $K'$ are related constants. The approximately 6dB change in the $V_{OUT}:V_{REF}$ ratio as well as the $V_{OUT}:V_{IN}$ ratio is realized by selectively switching the connections of impedances in the network such that either one (for a ratio value of $K/2$ or $K'/2$) or both impedances (for a ratio value of K or $K'$) are connected between $V_{IN}$ and the output circuit. If either network impedance is not connected between the input node and output circuit, such impedance forms a dummy load between the output circuit and ground.

It is thus an object of the present voltage ratio doubler circuit to selectively provide a $V_{OUT}:V_{REF}$ ratio of $K/2$ or K and a $V_{OUT}:V_{IN}$ ratio of $K'/2$ or $K'$.

It is also an object of the invention to change the ratios $V_{OUT}:V_{REF}$ and $V_{OUT}:V_{IN}$ between the two levels of (a) $K/2$ and K and (b) $K'/2$ and $K'$, respectively, without varying the voltage $V_{IN}$, the voltage $V_{IN}$ thereby representing an ideal, constant voltage source.

Further, in accordance with the invention, by properly selecting (a) the impedance across which $V_{REF}$ is measured and (b) the load impedance across which $V_{OUT}$ is measured, the value of K can be made equal to 1. It is thus an object of this embodiment to switch the value of the ratio $V_{OUT}:V_{REF}$ to a value of $\frac{1}{2}$ or 1. Under similar impedance value conditions it is a related object to switch the value of the ratio $V_{OUT}:V_{IN}$ to a value of $\frac{1}{4}$ or $\frac{1}{2}$.

It is yet a further object of the invention to use each of the two impedances in the network as either (a) a connective impedance between $V_{IN}$ and the output circuit or (b) a dummy load between the output circuit and ground to achieve the dual result of achieving voltage ratio doubling between $V_{OUT}$ and $V_{REF}$ while maintaining the voltage $V_{IN}$ at a constant level.

DESCRIPTION OF THE INVENTION

Figure 1:
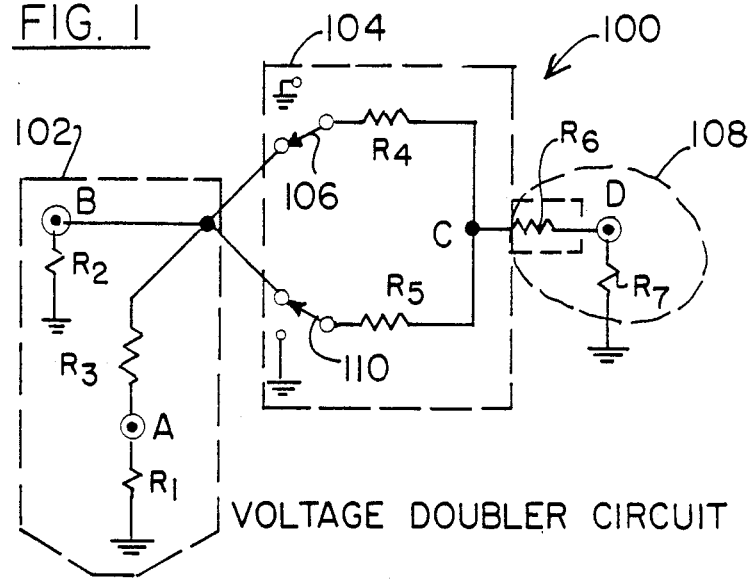
FIG. 1 is a circuit diagram of the invention.

In FIG. 1, the voltage ratio doubler circuit 100 of the invention is shown. At the input end of the doubler circuit 100 is a voltage leveller circuit 102, which is, by way of example, shown as a power splitter voltage leveller circuit. The voltage leveller circuit 102 has a reference node A and an input node B which are at voltages $V_{REF}$ and $V_{IN}$, respectively, relative to ground. Conventionally, the voltage at node A is used to control the voltage at node B to maintain a constant voltage $V_{IN}$ by means of a power splitter feedback arrangement (not shown). In the voltage leveller circuit 102, an impedance $R_1$ is located between the reference node A and ground and an impedance $R_2$ is located between the input node B and ground. An impedance $R_3$ is interposed between the reference node A and the input node B. $V_{REF}$, it is noted, is a voltage derived from a divider circuit across $V_{IN}$, $V_{REF}$ being measured between impedances $R_1$ and $R_3$ across which $V_{IN}$ is provided. In accordance with the present circuit, the voltage $V_{IN}$ at the input node B is at a constant level. $V_{IN}$, it is noted, represents an ideal voltage source and input node B a virtual ground, with respect to the load.

Connected to the input node B is an impedance network 104. The impedance network 104 includes two resistors $R_4$ and $R_5$ having a common node C therebetween. Also included in the network 104 is a switching element 106 which selectively connects impedance $R_4$ either (a) between the input node B and the common node C or (b) between the common node C and ground. Similarly, a switching element 110 selectively connects impedance $R_5$ either (a) between the input node B and the common node C or (b) between the common node C and ground.

The voltage ratio doubler circuit 100 further includes an output node D which is at a voltage $V_{OUT}$ relative to ground. The output node D is connected to the common node C through an impedance $R_6$ and is connected to ground through a load impedance $R_7$. Impedances $R_6$ and $R_7$, as well as nodes C and D, form an output circuit 108.

In accordance with the invention, various impedances in the voltage ratio doubler circuit 100 have predetermined relative values. In normalized form, impedance $R_3$ has the same value R. By way of example, each impedance having a value R may be 50 ohms. The impedances $R_4$ and $R_5$ have normalized values of 4R/3, or approximately 67 ohms when R is 50 ohms, $R_6$ has a normalized value of R/3. The values of impedances $R_1$, $R_2$, and $R_7$, it will be shown, are not restricted in value and may, thus, have any convenient value, although a value of R may be preferred.

Referring to FIG. 1, it should be noted that $R_1$ represents a reference or leveller circuit input impedance; $R_2$ represents a generator or source impedance; $R_3$ represents the impedance between nodes A and B; $R_4$ and $R_5$ are network impedances, each having a value 4R/3; $R_6$ in the output circuit is R/3; and $R_7$ is the load impedance.

It is to be noted that the switching elements 106 and 110 are preferably coordinated by conventional interconnections such that either (a) impedance $R_4$ or (b) impedance $R_5$ or (c) both are connected between the input node B and the common node C at any given time. Because impedances $R_4$ and $R_5$ are preferably never both, at the same time, connected as dummy loads to ground, known mechanical or electrical means may be provided which permits only one or no impedances to be connected to ground as a dummy load. In this regard, it is noted that, although not preferred, the voltage ratio doubler circuit 100 may be disconnected by connecting neither impedance $R_4$ or $R_5$ between nodes B and C, there being essentially no output voltage $V_{OUT}$.

In operation, the switches 106 and 110 may be selectively positioned so that either one or both of the impedances $R_4$ and $R_5$ are interconnected between the input node B and the common node C, the impedance $R_4$ or $R_5$ (if any) which is not connected therebetween being connected instead to ground. With both impedances connected between the input node B and the common node C, $V_{OUT}/V_{REF}=K$. By selectively actuating the switching elements 106 and 110, the value of the ratio $V_{OUT}/V_{REF}$ can be varied between two levels K/2 and the doubled level K. The voltage ratio doubler circuit 100 with the impedances $R_4$ and $R_5$ switched in the various configurations provides a constant voltage $V_{IN}$. In the general case $V_{IN}$ is kept constant by a conventional feedback circuit connected between node A and node B, regardless of the switching configuration selected. Thus, $V_{IN}$ should not vary regardless of switching arrangement and represents an ideal voltage source (which is identified as $E_S$).

Figure 2:
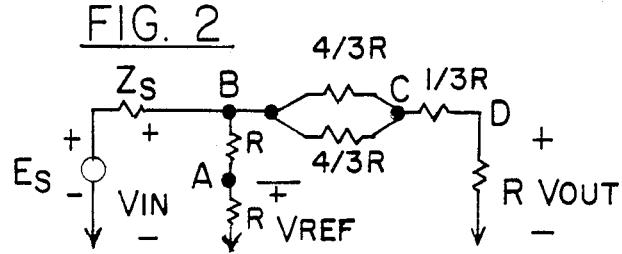
FIGS. 2 and 3 are circuit arrangements based on the voltage ratio doubler circuit of FIG. 1, with the switches 106 and 110 actuated in predefined fashions.

FIG. 2 represents the voltage ratio doubler circuit 100 with both $R_4$ and $R_5$ between nodes B and C and with the output impedance $R_7$ and reference impedance $R_1$ equal to R. An analysis of the circuit in FIG. 2 shows that in such an arrangement, $V_{OUT}=V_{REF}=V_{IN}/2$. That is:

$$V_{REF} = \left(\frac{R_1}{R_1 + R_3}\right) V_{IN} = \left(\frac{R}{R + R}\right) V_{IN} = \frac{V_{IN}}{2}$$

in accordance with the voltage divider principle and $$V_{OUT} = \left(\frac{R_7}{R + R_7}\right) V_{IN} = \left(\frac{R}{R + R}\right) V_{IN} = \frac{V_{IN}}{2}$$

$$\therefore V_{OUT} = V_{REF}$$

Figure 3:
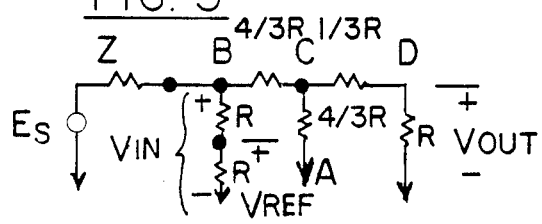

A similar analysis of FIG. 3 with impedances $R_1$ and $R_7$ (of FIG. 1) selected to be of value R and with only one impedance, e.g. $R_5$, connected between nodes B and C shows that the voltage at node C, namely $V_C$, is defined as:

$$V_C = \frac{(R_6 + R_7) \| (R_4)}{[(R_6 + R_7) \| (R_4)] + (R_5)} V_{IN}$$

according to the voltage divider principle. With $R_6$ valued at $R/3$ and $R_7$ valued at $R$ and with $R_4$ and $R_5$ valued at $4R/3$, $V_C=V_{IN}/3$. It is noted, however, that $$V_{OUT} = \left(\frac{R_7}{R_6 + R_7}\right) V_C = V_{IN}/4$$

and $$V_{REF} = \frac{V_{IN}}{2}$$

By combining equations (5) and (6), it is observed that in FIG. 3:

$$V_{OUT}=V_{REF}/2$$

By comparing equations (3) and (7), it is noted that $V_{OUT}/V_{REF}$ relating to the switched circuit arrangement of FIG. 2, is twice the value of $V_{OUT}/V_{REF}$ relating to the switched circuit arrangement of FIG. 3. In other words, switching between the FIG. 3 circuit arrangement and the FIG. 2 circuit arrangement results in a ratio doubling effect. Similarly, the value of the ratio $V_{OUT}/V_{IN}$ relating to the switching arrangement in FIG. 2 is also twice the value of $V_{OUT}/V_{IN}$ relating to the switching arrangement of FIG. 3.

Figure 4:
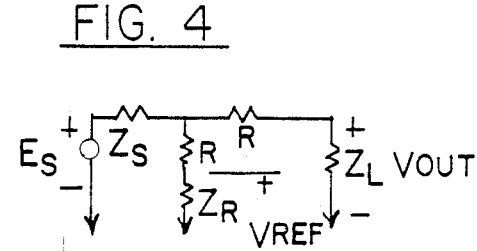
FIGS. 4 and 5 are circuit arrangements based on the voltage ratio doubler circuit of FIG. 1, with the switches 106 and 110 actuated in predefined fashions, and with impedances $R_1$ and $R_7$ having any value.
Figure 5:
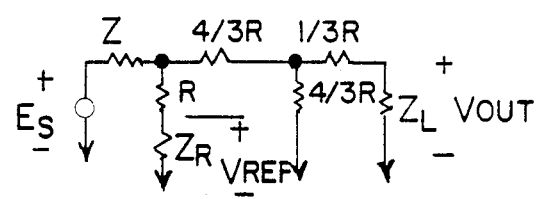

Referring now to FIGS. 4 and 5, it is noted that the voltage ratio doubling function is achieved regardless of the values of $R_1$ and $R_7$. If $R_1$ has an impedance value of $Z_R$, and $R_7$ has an impedance value of $Z_L$, the voltage doubler circuit 100 of FIG. 1 is represented by FIG. 4 when $R_4$ and $R_5$ are connected between nodes B and C and by FIG. 5 when only $R_4$ or $R_5$ is connected between nodes B and C.

An analysis of the circuit in FIG. 4 indicates that:

$$\frac{V_{OUT}}{V_{REF}} = \frac{Z_L(Z_R + R)}{Z_R(Z_L + R)} = K$$

In FIG. 5, the ratio of $V_{OUT}/V_{REF}$ is found to be:

$$\frac{V_{OUT}}{V_{REF}} = \frac{1}{2} \cdot \frac{Z_L(Z_R + R)}{Z_R(Z_L + R)} = \frac{K}{2}$$

That is, the ratio of $V_{OUT}/V_{REF}$ is twice as large in the circuit arrangement in FIG. 4 as in the circuit arrangement of FIG. 5. $V_{OUT}/V_{REF}$ is thus switchable between the two levels—one of which is double the other—even where the impedances $R_1$ and $R_7$ are of any value. In this case, $V_{OUT}/V_{REF}$ does not switch between values of $\frac{1}{2}$ and 1, but nonetheless provides a doubling between $K/2$ and $K$, where $K$ is a function of reference impedance $Z_R$ (i.e. $R_1$) and load impedance $Z_L$ ($R_7$). It is, of course, noted that when $Z_R=Z_L$, $K=1$ and the special case of $V_{OUT}/V_{REF}$ changing between values of $\frac{1}{2}$ and 1 results.

Because $Z_R$ in FIGS. 4 and 5 is in a fixed relationship with the input impedance between node B and ground, it is noted that the ratio of $V_{OUT}/V_{IN}$ similarly switches between two values in this generalized case. That is, the ratio $V_{OUT}/V_{IN}$ switches between the values $K'$ and $K'/2$ where $K'$, like $K$, is an impedance-related constant.

It should be realized that the present embodiment employs a conventional power splitter voltage leveller circuit (shown in part in FIG. 1). In such a leveller circuit, the reference voltage $V_{REF}$ is conveniently measured and used to maintain the input voltage $V_{IN}$ at a constant level in known fashion. It should also be realized, however, that other circuits or means which provide a constant voltage source (at voltage $V_{IN}$) would represent equivalent or substitute leveller circuits. The precise form of the leveller circuit is not critical, although the power splitter voltage leveller circuit includes a convenient measurement point at the reference node. In this regard, it should, of course, be realized that the voltage ratio which is changed in value can be, as previously discussed, the ratio of $V_{OUT}:V_{IN}$ or the ratio of $V_{OUT}$ to a conveniently measured reference voltage $V_{REF}$ which is in a fixed relationship with respect to $V_{IN}$ (as in the power splitter voltage leveller embodiment).

Figure 6:
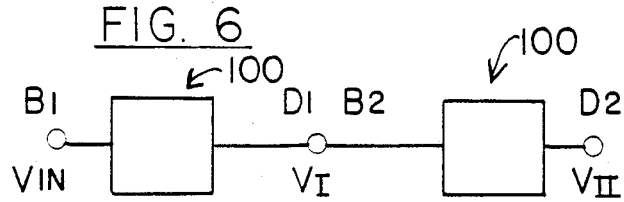
FIG. 6 is a diagram showing a plurality of circuits of the invention connected in cascade.

Further, referring to FIG. 6, it is noted that a plurality of ratio doubler circuits 100 may be connected in a cascaded series. Because the impedance looking into the output of each circuit 100 appears constant regardless of how the network impedances $R_4$ and $R_5$ are connected, the output node D, of one circuit I can be coupled to the input node $B_2$ of another circuit II. The output node D, of circuit I has a voltage $V_I$. The ratio $V_I:V_{IN}$ can, as previously discussed, be switched between $K'$ and $K'/2$. The output node $D_2$ of circuit II has a voltage $V_{II}$. The ratio $V_{II}:V_{IN}$ would—with $V_I:V_{IN}$ equal to $K'/2$—be switchable between $K'/2$ and $K'/4$. Similarly, with $\eta$ circuits 100, or stages, the ratios of $K'$, $K'/2$ ... $K'/2\eta$ could be produced.

It is, of course, further noted that with $V_{IN}$ held constant and the ratio of $V_{OUT}:V_{IN}$ changing between a value $K'/2$ and $K'$, $V_{OUT}$ is itself stepped between two values, one of which is double the other. In such a case, the voltage ratio doubler functions as a voltage doubler as well. That is, the voltage doubler is just a special case of the ratio doubler circuit.

Other improvements, modifications and embodiments will become apparent to one of ordinary skill in the art upon review of this disclosure. Such improvements, modifications, and embodiments are considered to be within the scope of this invention as defined by the following claims.

We claim:

1. A voltage ratio doubler circuit comprising:
   leveller means, having an input node, for maintaining the input voltage $V_{IN}$ at the input node at a constant level;
   an output node at an output voltage $V_{OUT}$; and
   means, coupled between the input node and the output node, for selectively determining the ratio $V_{OUT}/V_{IN}$ to equal either (a) a first predetermined value or (b) one-half said predetermined value.

2. A voltage ratio doubler circuit according to claim 1 wherein the ratio determining means comprises
   an impedance network comprising (a) a first impedance having a normalized value of $4R/3$ and (b) a second impedance having a normalized value of $4R/3$;
   a common node between the first impedance and the second impedance;
   means for selectively connecting either (i) both the first impedance and the second impedance in parallel between the input node and the common node or; (ii) the first impedance between the input node and the common node; or (iii) the second impedance between the input node and the common node; and means for selectively connecting either (i) the first impedance between the common node and ground; or (ii) the second impedance between the common node and ground if and when such first or second impedance is not selectively connected between the input node and the common node.

3. A voltage ratio doubler circuit according to claim 2 further comprising
a third impedance interposed between the common node and the output node, the third impedance having a value R/3.

4. A voltage ratio doubler circuit according to claim 3 further comprising
a load impedance between the output node and ground of a value R; and
an impedance between the input node and ground of a value R;
wherein K' has the value ½.

5. A voltage ratio double circuit for providing a voltage ratio $V_{OUT}/V_{REF}$ which is equal to either (a) a first predetermined value K or (b) one-half said predetermined, the circuit comprising
a voltage leveller circuit having (a) an input node at a voltage $V_{IN}$; (b) a reference node having a reference voltage $V_{REF}$ which is conveniently measurable and provides a control signal for maintaining the voltage $V_{IN}$ constant; (c) a first impedance connected between the reference node and ground; (d) a second impedance connected between the input node and ground; and (e) a third impedance connected between the reference node and the input node, wherein the third impedance has a normalized value of R;
a fourth impedance having a normalized value of 4R/3 and a fifth impedance having a normalized value of 4R/3;
a common node between the fourth impedance and the fifth impedance;
means for (a) selectively connecting either (i) both the fourth impedance and fifth impedance in parallel, (ii) the fourth impedance, or (iii) the fifth impedance between the input node and the common node; and (b) selectively connecting either (i) the fourth impedance, (ii) the fifth impedance, or (iii) neither between the common node and ground if and when such fourth or fifth impedance is not selectively connected between the input node and the common node;
an output node at the output voltage $V_{OUT}$;
a sixth impedance, having a normalized value of R/3 connected between the output node and the common node; and
a load impedance, connected between the output node and ground.

6. A circuit according to claim 5 wherein the selective connecting means comprises
a first switch means for selectively coupling the fourth impedance between either (a) the input node and the common node or (b) the common node and ground; and
a second switch means for selectively coupling the fifth impedance between either (a) the input node and the common node or (b) the common node and ground.

7. A circuit according to claim 6 wherein R comprises a system impedance having a value substantially equal to 50 ohms.

8. A circuit according to claim 5 wherein the equivalent impedance between the input node and ground appears constant at the output node whether either (a) both the fourth impedance and fifth impedance in parallel, (b) the fourth impedance, or (c) the fifth impedance are selectively connected between the input node and the common node.

9. A circuit according to claim 6 wherein the equivalent impedance between the input node and ground remains the same whether either (a) both the fourth impedance and fifth impedance in parallel, (b) the fourth impedance, or (c) the fifth impedance are selectively connected between the input node and the common node.

10. A circuit according to claim 8 wherein the value of the first impedance and the third impedance remain constant, the value of the reference voltage $V_{REF}$ defined therebetween thereby remaining constant when constant input is applied to the input node.

11. A voltage ratio doubler circuit for providing a voltage ratio $V_{OUT}/V_{REF}$ which is equal to either (a) one, or (b) one-half the circuit comprising
a voltage leveller circuit having (a) an input node at a voltage $V_{IN}$, (b) a reference node having a reference voltage $V_{REF}$ which is conveniently measurable and provides a control signal for maintaining the voltage $V_{IN}$ constant, (c) a first impedance connected between the reference node and ground, (d) a second impedance connected between the input node and ground, (d) a second impedance connected between the input node and ground, and (e) a third impedance connected between the reference node and the input node, wherein the first and third impedance each has a normalized impedance of R;
a fourth impedance having a normalized impedance of 4R/3 and a fifth impedance having a normalized value of 4R/3;
a common node between the fourth impedance and the fifth impedance, the fourth impedance being permanently connected between the input node and the common node;
means for (a) selectively connecting either (i) both the fourth and fifth impedance in parallel between the input node and ground, or (ii) the fourth impedance between the input node and the common node, and (b) selectively connecting the fifth impedance between the common node and ground if and when such fifth impedance is not selectively connected between the input node and the common node;
an output node at the output voltage $V_{OUT}$;
a sixth impedance, having a normalized value of R/3, connected between the output node and the common node; and
a load impedance, having a normalized value of R, connected between the output node and ground.

12. A circuit according to claim 11 wherein the selective connecting means comprises
switch means for selectively coupling the fifth impedance between either (a) the common node and the input node or (b) the common node and ground.

13. A circuit according to claim 12 wherein the switch means comprises
a single-pole, double-throw switch.

14. A circuit according to claim 5 wherein the first impedance has a normalized impedance of R.

15. A circuit according to claim 5 wherein the load impedance has a normalized impedance of R.

16. A circuit according to claim 14 wherein the load impedance has a normalized impedance of R and wherein R is essentially 50 ohms.

17. A circuit for maintaining a constant impedance across an input voltage $V_{IN}$ with respect to ground, where the ratio of the output voltage $V_{OUT}$ to a measurable reference voltage $V_{REF}$, which is related to the input voltage $V_{IN}$, selectively equals either (a) a value K or (b) K/2, where K is an impedance-related constant, the circuit comprising a source circuit having (a) a reference node at the reference voltage $V_{REF}$, (b) an input node at the voltage $V_{IN}$, (c) a first impedance connected between the reference node and ground, (d) a second impedance connected between the input node and ground, and (e) a third impedance connected between the reference node and the input node, wherein the second and third impedance each has a normalized impedance of R;

a fourth impedance having a normalized impedance of 4R/3 and a fifth impedance having a normalized value of 4R/3;

a common node between the fourth impedance and the fifth impedance;

means for (a) selectively connecting either (i) both the fourth and fifth impedance in parallel between the input node and the common node, (ii) the fourth impedance between the input node and the common node, or (iii) the fifth impedance between the input node and the common node, and (b) selectively connecting either (i) the fourth impedance, (ii) the fifth impedance or (iii) neither between the common node and ground if and when such fourth or fifth impedance is not selectively connected between the input node and the common node;

an output node at the output voltage $V_{OUT}$;

a sixth impedance, having a normalized value of R/3, connected between the output node and the common node; and a seventh impedance connected between the output node and ground.

18. A circuit according to claim 17 wherein the values of the first impedance and the third impedance remain constant, the value of the reference voltage $V_{REF}$ defined therebetween thereby remaining constant when constant input is applied to node B and the value of the output voltage $V_{OUT}$ equalling $K(V_{REF})$ or $K/2(V_{REF})$ depending on whether both or one of the fourth and fifth impedances are connected between the input node and the common node.

19. A circuit according to claim 12 wherein the values of the first impedance and the third impedance remain constant, the value of the reference voltage $V_{REF}$ defined therebetween thereby remaining constant when constant input is applied to node B and the value of the output voltage $V_{OUT}$ equalling $V_{REF}$ or $V_{REF}/2$ depending on whether both or one of the fourth and fifth impedances are connected between the input node and the common node.

20. A circuit according to claim 17 wherein the first impedance and the seventh impedance each has a normalized impedance of R.

21. A circuit according to claim 17 wherein $Z_L$ is the value of the seventh impedance and $Z_R$ is the value of the first impedance; and wherein the connection of the impedances results in K being defined, in normalized form, as:

$$K = \frac{Z_L(Z_R + R)}{Z_R(Z_L + R)}$$

22. A circuit according to claim 20 wherein the connection of the impedances results in K being defined as one.

23. A plurality of $\eta$ circuits according to claim 20, the circuits being connected in cascaded series fashion, the input node of one circuit being coupled to the output node of another circuit such that voltage ratios of $K'$, $K'/2, \ldots, K'/2^\eta$ are selectively generated at serial output nodes.

* * * * *